United States Patent [19]
Yates et al.

[11] Patent Number: 5,481,577
[45] Date of Patent: Jan. 2, 1996

[54] BOILING WATER REACTOR FUEL ASSEMBLY FILTER

[75] Inventors: Jack Yates, Coopeville; Harold E. Williamson; Roger L. Braaten, both of Richland, all of Wash.

[73] Assignee: Siemens Power Corporation, Richland, Wash.

[21] Appl. No.: 268,397

[22] Filed: Jun. 30, 1994

[51] Int. Cl.[6] .................................... G21C 19/42
[52] U.S. Cl. .................. 376/313; 376/310; 376/314; 376/315; 376/438
[58] Field of Search .................... 376/313, 314, 376/310, 315, 438; 210/500.23; 976/DIG. 264

[56] References Cited

U.S. PATENT DOCUMENTS

| | | | |
|---|---|---|---|
| 3,803,816 | 4/1974 | McGuire | 55/385 |
| 4,678,627 | 7/1987 | Rylatt | 376/313 |
| 4,733,852 | 3/1988 | Glasgow et al. | 266/227 |
| 4,775,471 | 10/1988 | Nagai et al. | 210/323.2 |
| 4,900,507 | 2/1990 | Shallenberger et al. | 376/352 |
| 5,024,806 | 6/1991 | Cioffi et al. | 376/352 |
| 5,030,412 | 7/1991 | Yates et al. | 376/352 |
| 5,094,750 | 3/1992 | Kopp et al. | 210/321.81 |
| 5,318,606 | 6/1994 | Geibel et al. | 55/269 |
| 5,384,814 | 1/1995 | Matzner et al. | 376/352 |

*Primary Examiner*—Donald P. Walsh
*Assistant Examiner*—Meena Chelliah
*Attorney, Agent, or Firm*—Ira Lee Zebrak

[57] ABSTRACT

A reactor coolant debris filter for insertion within a nuclear fuel assembly support.

10 Claims, 4 Drawing Sheets

5,481,577

BOILING WATER REACTOR FUEL ASSEMBLY FILTER

INTRODUCTION

1. Field of the Invention

The present invention is directed to debris filters for nuclear reactor fuel and more particularly to debris filters for Boiling Water Reactor (BWR) nuclear fuel assemblies.

BACKGROUND

As a result of experience with long term operation and multiple reloads of nuclear fuel elements, it has been found that certain operating conditions arise which tend to reduce energy output per unit of fuel obtainable and thereby affect operating costs and efficiencies in an undesirable manner.

One of the problems in connection with the operation of nuclear reactors is the accumulation of debris of various sizes, which may occur during original construction, subsequent operation or during repair. Examples of such debris include small fasteners, metal clips, welding slag, and small pieces of wire. During the operation of nuclear reactors, the debris which may be present in the nuclear reactor can be carried by the cooling water and can impact upon fuel assembly components. The repeated interaction of such debris and fuel assembly components can result in fretting damage to the components. Certain sizes of this type of debris are particularly troublesome, since that debris is likely to be carried by cooling water to the area near the bottom (lower ends) of the fuel rods. Some of the debris can be caught between the fuel rods and other fuel assembly components. The debris vibrates in the moving coolant and impacts principally upon the lower end of the fuel rods, ultimately abrading and causing fretting wear of the fuel rod cladding at that point. This type of wear is recognized as a significant cause of fuel failures which may release fuel and fission products into the coolant leading to the premature withdrawal from service of the fuel assembly or costly fuel rod replacement.

Attempts have been made in the past to mitigate the affect of such debris on the fuel rods by incorporating integral filter mechanisms during the manufacture of new fuel assemblies containing unirradiated nuclear fuel. However, the problem of protecting irradiated nuclear fuel rods in a nuclear fuel assembly has been more problematic and costly. While the incorporation of debris resistant features in new fuel assemblies during their manufacture is known, it would be an advantage over the prior art to provide debris resistance for irradiated fuel assemblies not so equipped or requiring further debris resistant features. The physical configuration of typical BWR assemblies, however, precludes retrofitting of debris resistant devices to the irradiated fuel assembly without incurring unacceptably high costs. This is due particularly (a) to the configuration of the lower tie plate where debris resistant features must be incorporated to the fuel assembly, and (b) to the need to modify the fuel assembly remotely, typically under several feet of water.

OBJECTS OF THE INVENTION

It is an object of the present invention to provide a debris filter for new as well as irradiated nuclear fuel assemblies which does not require the alteration or modification of the fuel assembly or its design but which is positioned external to and below the bottom of the fuel assembly and within the fuel support on which the fuel assembly normally sits.

It is another object of the invention to provide a debris filter that is removable, reusable and interchangeable.

SUMMARY OF THE INVENTION

These and other objects of the invention are achieved by providing a reactor coolant debris filter for insertion within a nuclear fuel assembly support for capturing debris carried by reactor coolant flow before the debris enters the fuel assembly and causes fuel rod cladding damage, the fuel assembly support having a seat for supporting the fuel assembly and a flow duct for the passage of reactor coolant through the fuel assembly support to the fuel assembly, the debris filter comprising an interface adapter having on an upper surface a fuel assembly seat for positioning the fuel assembly on the filter, and a lower seating surface on a lower surface for positioning the filter in the flow duct of the fuel assembly support, the interface adapter being adapted to form an aperture for reactor coolant to exit the filter and enter the fuel assembly, a filter grid for capturing debris carried by reactor coolant flow, and a hollow shell having a first end attached to the interface adapter and a second end for supporting the filter grid.

DETAILED DESCRIPTION

Figure 1:
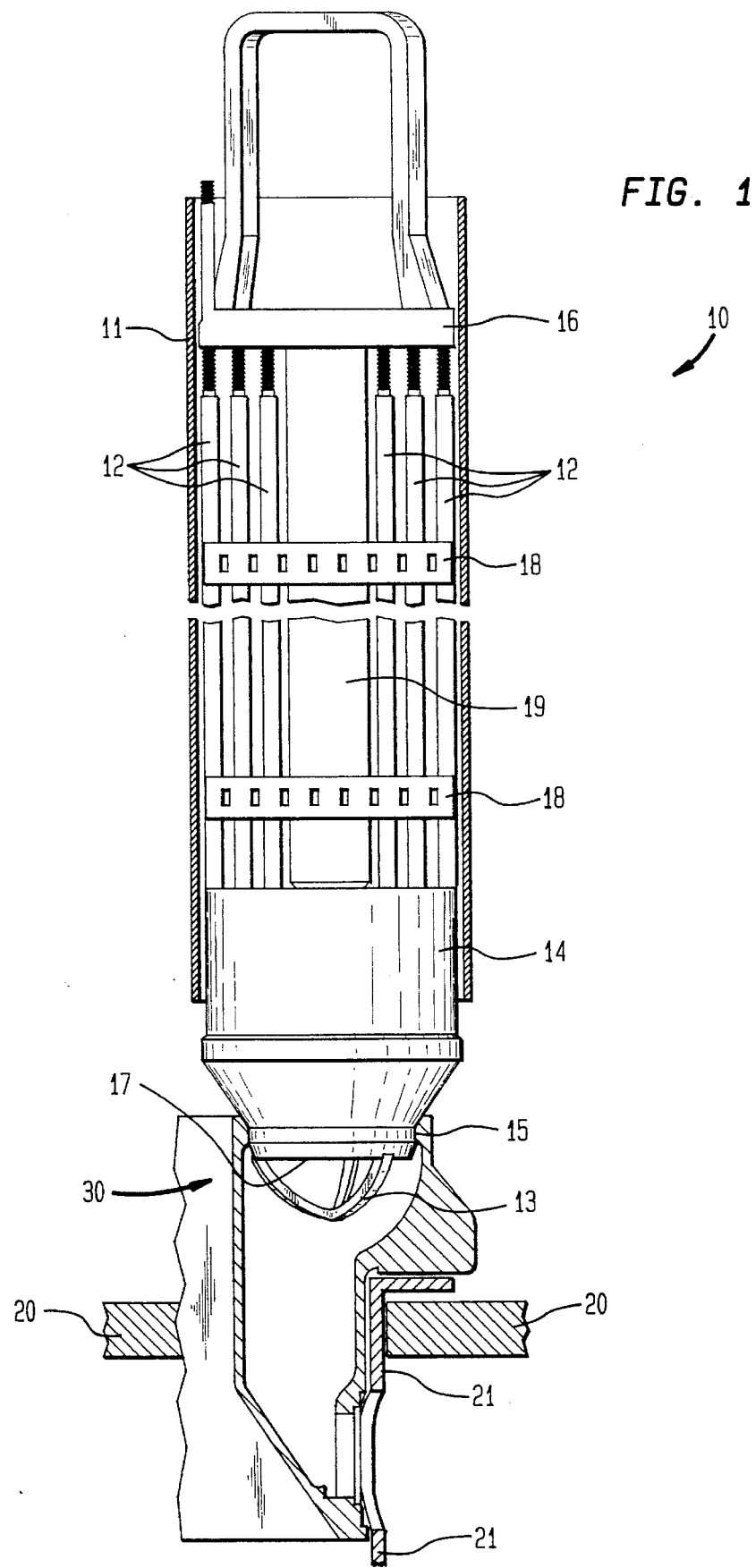
FIG. 1 is a cross-sectional view of a typical boiling water nuclear fuel assembly positioned on the fuel assembly support located laterally in accordance with the prior art.

Referring to FIG. 1, a boiling water reactor fuel assembly having a 9×9 fuel rod array is generally shown at 10 having elongated fuel rods 12 containing nuclear fuel pellets. The fuel rods are supported between a lower tie plate 14 and upper tie plate 16 and pass through spacer grids 18 which provide intermediate support of rods 12 over the length of fuel assembly 10. An inner water channel 19 is at the center of the array of fuel rods 12 and replaces the innermost three by three array of fuel rods. Outer channel 11 is shown around the fuel rods 12 and spacers 18. It will be readily understood by those skilled in the art that the present invention can be used with any type of BWR fuel assembly or any fuel rod array not just the one shown in FIG. 1 for illustration purposes. Inlet nozzle 15 contains a coolant inlet aperture 17 which is surrounded by a multi-pronged fuel assembly insertion guide 13. Each fuel assembly rests upon a fuel assembly support 30 which is located laterally by lower core plate 20 and supported vertically by control rod guide tube 21.

Figure 2:
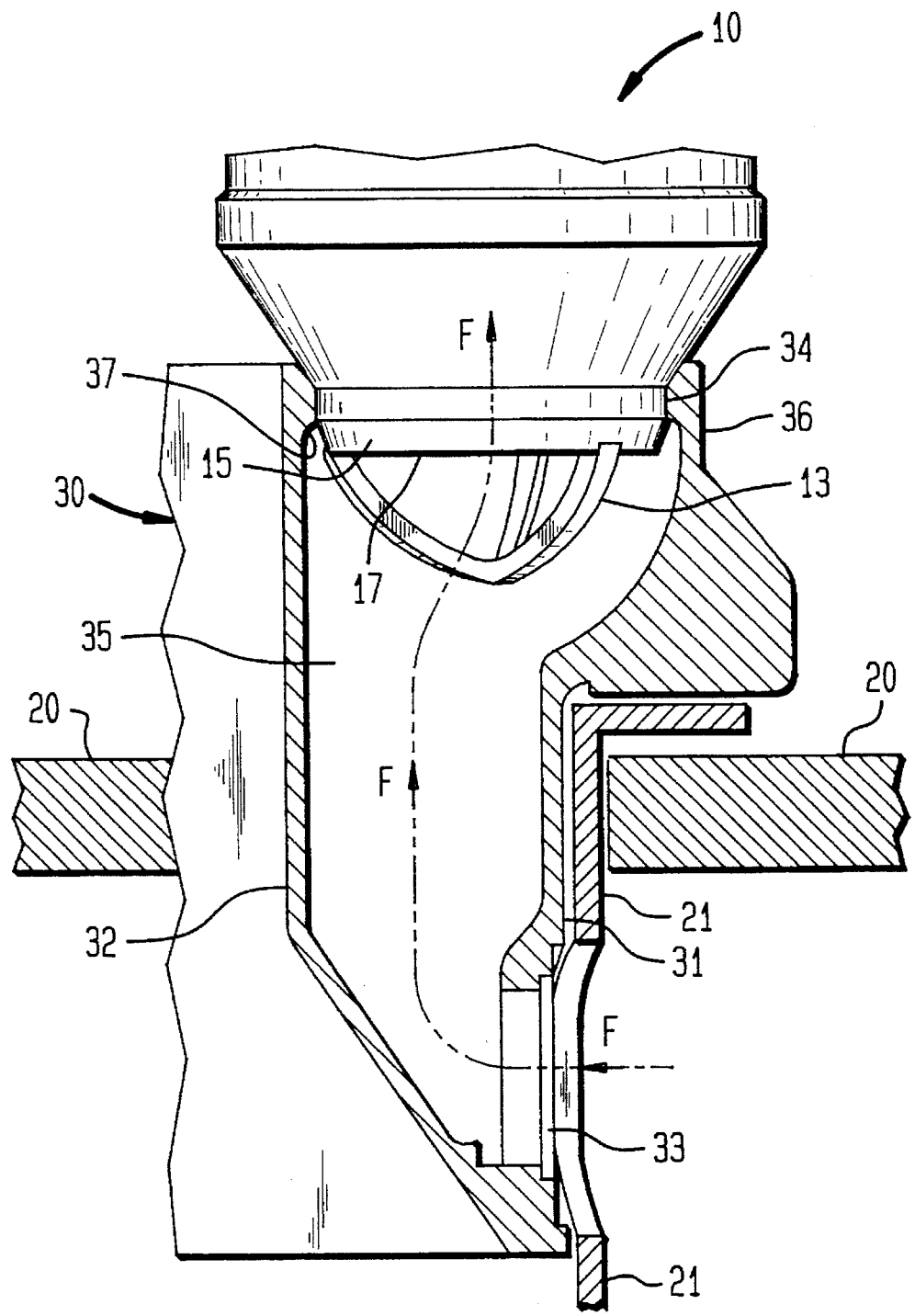
FIG. 2 is an enlarged view of the lower portion of the fuel assembly, fuel assembly support, and core support plate of FIG. 1.
Figure 4:
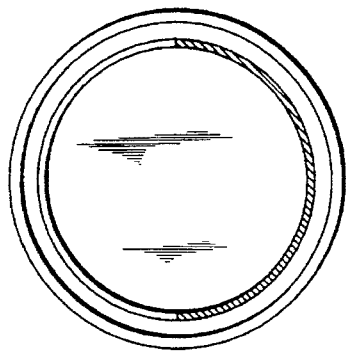
FIG. 4 is a top view of the debris filter shown in FIG. 3.
Figure 6:
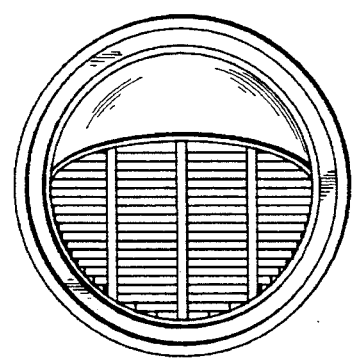
FIG. 6 is a sectional view of the debris filter shown in FIG. 5 taken along line 6—6.

Referring to FIG. 2, which is an enlarged view of the lower portion of FIG. 1, fuel assembly support 30 is comprised of outer wall 31 and inner wall 32 which are adapted to form flow duct 35, coolant entrance orifice 33, and fuel assembly support aperture 34. Reactor coolant flow enters coolant entrance orifice 33, passes through flow duct 35 and exits fuel assembly support 30 by entering aperture 17 of fuel assembly 10 as shown by the flow arrows F in FIG. 2. Fuel assembly 10 is seated against seat 36 which precludes flow from bypassing coolant entrance aperture 17 of fuel assembly 10.

The following described embodiments present the debris filter and its position within the fuel assembly support.

Figure 3:
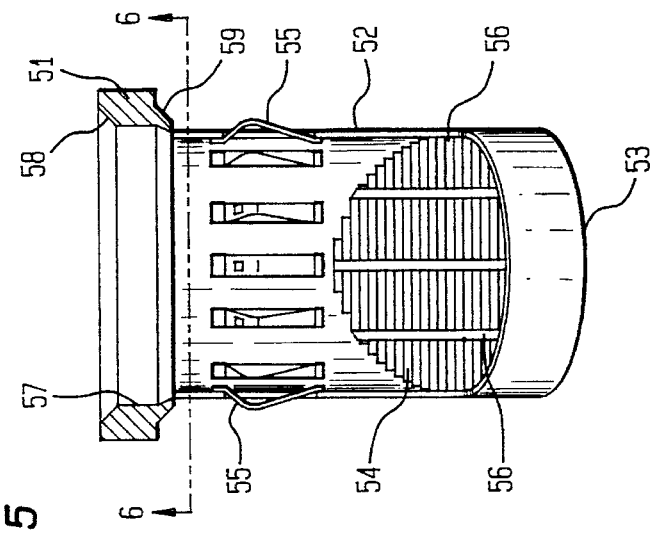
FIG. 3 illustrates a longitudinal view (partly broken away) of a debris filter in accordance with the present invention for insertion in the fuel assembly support of FIGS. 1 and 2.
Figure 5:
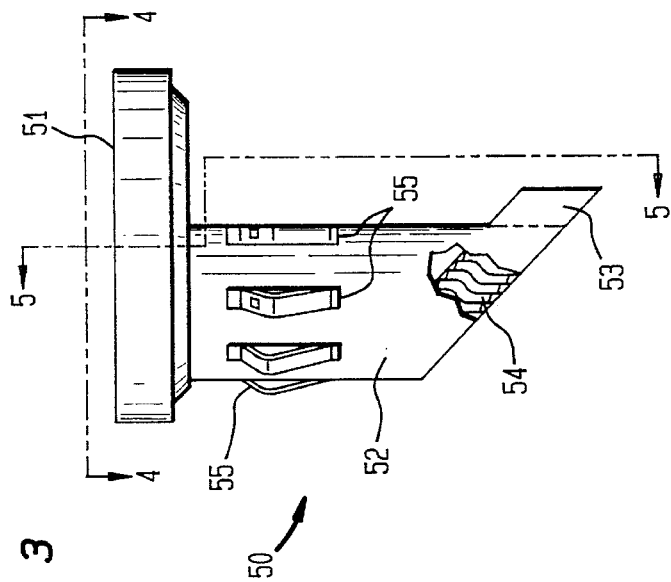
FIG. 5 is a sectional view of the debris filter shown in FIG. 3 taken along line 5—5.
Figure 8:
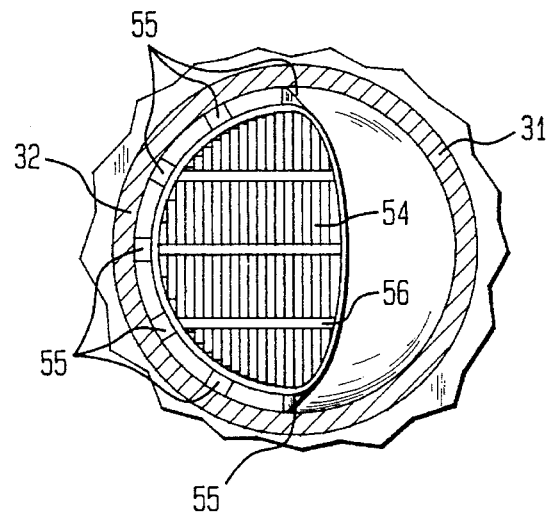
FIG. 8 is a cross-sectional view of FIG. 7 taken along line 8—8.

Referring to FIG. 3, the debris filter 50 for insertion into the fuel assembly support 30 and below the fuel assembly 10 is shown. Debris filter 50 comprises an interface adapter 51 to which is attached a hollow shell 52. Hollow shell 52 is in the form of a semi-circular wall except at its lower end, where a continuation 53 serves to surround the outer perimeter of filter grid 54. The lower end of semi-circular hollow shell 52 is formed at an oblique angle. Filter grid 54 is affixed to the oblique angled lower end of semi-circular shell 52 and to continuation 53 as shown in FIGS. 3 and 5. Secured to shell 52 are leaf springs 55.

Referring to FIG. 5 which is a sectional view taken along line 5—5 in FIG. 3, the inner wall of semi-circular hollow shell 52 together with springs 55 are shown. Filter grid 54 is structurally reinforced by filter grid ribs 56 which also serve to establish spacing of individual pieces comprising grid 54. Grid 54 and ribs 56 are affixed to shell 52 and continuation 53. Interface adapter ring 51 is configured to provide a debris filter aperture 57 and a fuel assembly seat 58 which replicate the form and function of fuel support aperture 34 and seat 36, respectively. A lower seating surface 59 replicates the form of that portion of the lower tie plate which contacts seat 36.

Figure 7:
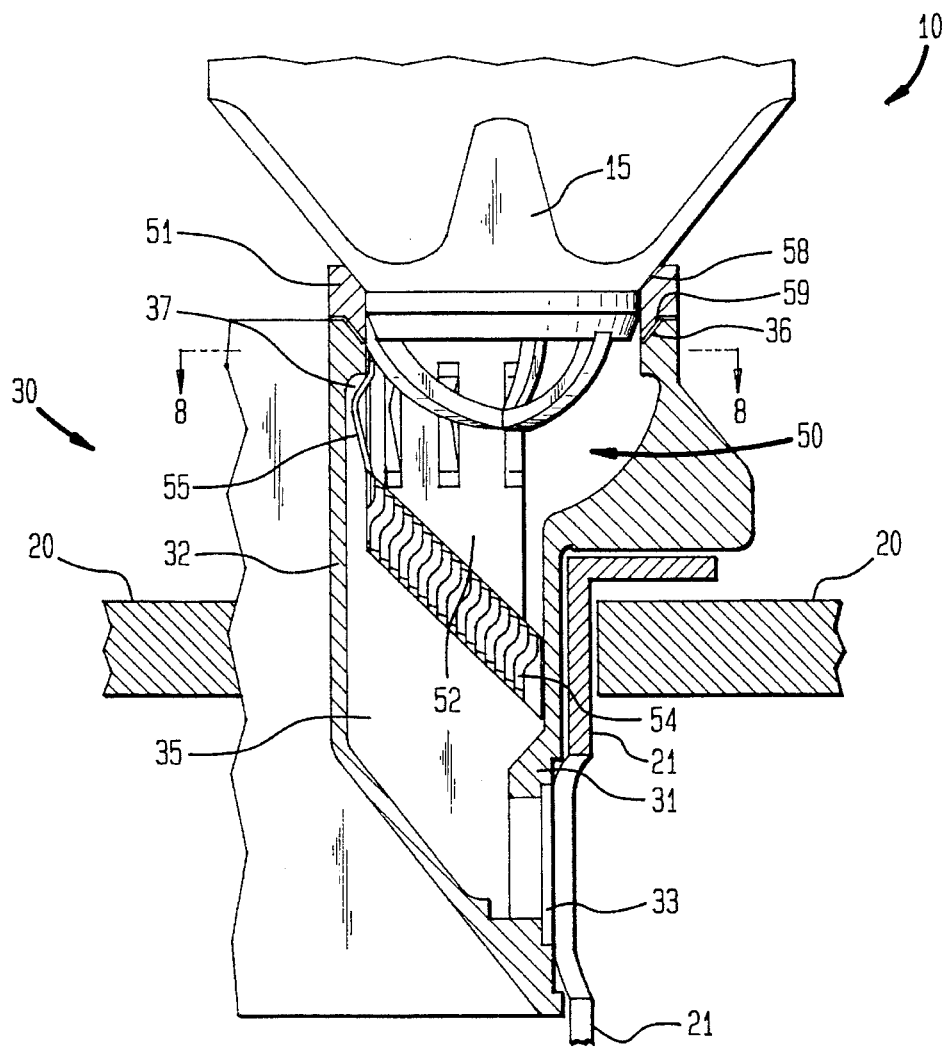
FIG. 7 is a cross-sectional view of the lower portion of a nuclear fuel assembly with the debris filter positioned in the fuel assembly support directly below the fuel assembly in accordance with the present invention.

Referring to FIG. 7, debris filter 50 is shown positioned within flow duct 35 of fuel assembly support 30 and below fuel assembly 10. Lower seating surface 59 seats against seat 36 of fuel assembly support 30. Inlet nozzle 15 of fuel assembly 10 is positioned within fuel assembly support aperture 57 and seats against fuel assembly seat 58 of interface adapter ring 51. Thus, coolant flow enters orifice 33, passes into flow duct 35 and through filter media grid 54 where it is filtered of debris, and then flows into inlet aperture 17 of fuel assembly 10.

Elevation of the active fuel position of the fuel assembly 10 in the core results from the installation of debris filter 50 in the fuel assembly support 30. The amount of elevation is determined by the height of interface adapter 51. In the embodiment shown in FIGS. 3–8, the elevation of the fuel assembly is increased by less than approximately ¾" and can be modified, if desired, according to the design of the core and the position of the control rod(s) when fully extended in the fuel assembly. The active portion of the control rods should extend to substantially the top of the active fuel zone when fully inserted, taking into account the normal tolerances of system components and thermal and radiation induced growth of the fuel.

During reactor operation, debris filter 50 is kept in position within flow chamber 35 by the weight of fuel assembly 10. Leaf springs 55 are provided to engage the recess 37 (FIG. 7) located at the upper underside of inside wall 32 within flow duct 35 and which function to retain debris filter 50 within flow duct 35 when the fuel assembly is lifted during refueling or other fuel handling operations. Debris filter 50 can either be removed or left in place, as desired, if new fuel assemblies incorporating integral debris filters are installed.

Although filter media 54 shown in FIGS. 3–8 is of the type described in U.S. Pat. No. 5,030,412 which is hereby incorporated by reference, filter media 54 can be fabricated of perforated sheet metal, wire mesh, coarse screen and various other designs can be utilized.

While the foregoing description and drawings represent the preferred embodiments of the present invention, it will be apparent to those skilled in the art that various changes and modifications may be made therein without departing from the true spirit and scope of the present invention.

We claim:

1. A reactor coolant debris filter for insertion within a nuclear fuel assembly support for capturing debris carried by reactor coolant flow before the debris enters the fuel assembly and causes fuel rod cladding damage, said fuel assembly support having a seat for supporting the fuel assembly and a flow duct for the passage of reactor coolant through the fuel assembly support to the fuel assembly, the debris filter comprising:

an interface adapter having on an upper surface a fuel assembly seat for positioning the fuel assembly on the filter, and a lower seating surface on a lower surface for positioning the filter in the flow duct of the fuel assembly support, the interface adapter being adapted to form an aperture for reactor coolant to exit the filter and enter the fuel assembly;

a filter grid for capturing debris carried by reactor coolant flow; and a hollow shell having a first end attached to the interface adapter and a second end for supporting the filter grid.

2. The debris filter of claim 1 further including filter grid ribs.

3. The debris filter of claim 2 wherein the hollow shell is a wall having a semi-circular cross-sectional shape.

4. The debris filter of claim 3 wherein the filter grid is configured to extend substantially across the flow duct of the nuclear fuel assembly support.

5. The debris filter as in claim 4 wherein the second end of the semi-circular hollow shell is at an oblique angle.

6. The debris filter as in claim 5 wherein the second end of the semi-circular hollow shell has a continuation which extends around the outer perimeter of the filter grid.

7. The debris filter as in claim 6 wherein the filter grid is fabricated of materials selected from the group of sheet metal, wire mesh, and coarse screen.

8. The debris filter as in claim 6 further including a spring connected to the semi-circular hollow shell for retaining the debris filter within the flow duct of the fuel assembly support when the fuel assembly is lifted from the fuel assembly support.

9. The debris filter as in claim 6 further including a spring connected to the interface adapter for retaining the debris filter within the flow duct of the fuel assembly support when the fuel assembly is lifted from the fuel assembly support.

10. The debris filter as in claim 6 wherein the height of the interface adapter is less than approximately ¾ inch.

* * * * *